United States Patent
Le Godec et al.

(10) Patent No.: US 8,182,778 B2
(45) Date of Patent: May 22, 2012

(54) BORON CARBIDE AND METHOD FOR MAKING SAME

(75) Inventors: Yann Le Godec, Paris (FR); Mohamed Mezouar, Grenoble (FR); Denis Andrault, Clermont-Ferrand (FR); Vladimir Solozhenko, Clichy (FR); Oleksandr Kurakevych, Clichy (FR)

(73) Assignees: Centre National de la Recherche Scientifique, Paris (FR); Universite Pierre et Marie Curie (Paris 6), Paris (FR); European Synchrotron Radiation Facility, Grenoble (FR)

( * ) Notice: Subject to any disclaimer, the term of this patent is extended or adjusted under 35 U.S.C. 154(b) by 348 days.

(21) Appl. No.: 12/595,680

(22) PCT Filed: Apr. 9, 2008

(86) PCT No.: PCT/FR2008/000494
§ 371 (c)(1),
(2), (4) Date: Dec. 23, 2009

(87) PCT Pub. No.: WO2008/139067
PCT Pub. Date: Nov. 20, 2008

(65) Prior Publication Data
US 2012/0058037 A1  Mar. 8, 2012

(30) Foreign Application Priority Data
Apr. 11, 2007 (FR) ..................... 07 02637

(51) Int. Cl.
*C01B 35/00* (2006.01)
*C01B 25/08* (2006.01)
*C01B 31/36* (2006.01)
*E21B 10/36* (2006.01)
*E21B 10/00* (2006.01)

(52) U.S. Cl. ........ 423/291; 423/276; 423/289; 175/425; 175/434; 175/374; 175/426

(58) Field of Classification Search ........................ None
See application file for complete search history.

(56) References Cited

OTHER PUBLICATIONS

Richter, A. et al., "Investigation of Novel Superhard Materials by Multi-Cycling Nanoindentation", Diamond & Related Materials, vol. 15, No. 11-12, pp. 2019-2023 (Nov. 22, 2006) XP-005805891.
Solozhenko, V. L. et al., "Production, Structure, Properties Synthesis of Superhard Composites in the B-C System", Journal of Superhard Materials, vol. 28, No. 5, pp. 1-6 (2006) XP-008085325.
Ottaviani, B. et al., "Boronated Carbons: Structural Characterization and Low Temperature Physical Properties of Disordered Solids", Journal of Materials Chemistry, vol. 8, No. 1, pp. 197-203 (1998) XP-002456559.
Flandrois, S. et al., "Boron-Substituted Carbons and Their Intercalation Compounds", Journal of Physics and Chemistry of Solids, vol. 57, No. 6-8, pp. 741-744 (1996) XP-002315247.
Hu, Q. et al., "First-Priniciples Studies of Structural and Electronic Properties of Hexagonal $BC_5$", Physical Review B, vol. 73, No. 21, pp. 2141161-1 (Jun. 1, 2006) XP-002456561.
Way, B. M. et al., "Preparation and Characterization of $B_xC_{1-x}$ Thin Films With the Graphite Structure", Physical Review B, vol. 46, No. 3, pp. 1697-1702 (Jul. 15, 1992) XP-002456560.
Wang, Q. et al., "Ab *initio* Calculation of Structural Properties of $C_3B$ and $C_5B$ Compounds", Physical Review B, vol. 55, No. 1, pp. 8-10 (Jan. 1, 1997) XP-002456562.

*Primary Examiner* — Melvin Mayes
*Assistant Examiner* — Guinever Gregorio
(74) *Attorney, Agent, or Firm* — Oblon, Spivak, McClelland, Maier & Neustadt, L.L.P.

(57) ABSTRACT

The invention relates to boron carbide and to a method for making the same, as well as to a super-abrasive material and a machine device including said boron carbide. The boron carbide of the invention has the following formula BC5 and has a diamond-type cubic structure with a mesh parameter a=3.635±0.006 &angst. The boron carbide of the invention can particularly be used in the field of machining.

6 Claims, No Drawings

BORON CARBIDE AND METHOD FOR MAKING SAME

The invention relates to a boron carbide and the manufacturing method thereof.

It also relates to a superabrasive material and to a machining device comprising this boron carbide.

Diamond has a very wide application in modern technology and science due to its unique properties such as extreme hardness, high thermal conductivity, a wide band gap, and high hole and electron mobility.

But it is also a material that is not resistant to oxidation and that reacts with ferrous metals.

The increase in demand for diamond-like materials in electronic and electrochemical applications for the cutting and shaping of hard metals and of ceramics has stimulated the search for novel advanced superhard phases which are thermally and chemically more stable than pure diamond.

Thus, traces of boron impurities were introduced into diamond structures in order to change the electrical properties of the diamond form in order to change from an insulator to a semiconductor.

Furthermore, boron-doped diamond is a type II supraconductor with a transition temperature $T_c$ of around 277.16° C. (4 K) whereas the boron carbide having a graphite (graphite-like) structure would be a superconductor with a transition temperature $T_c$ of around 295.16° C. (22 K).

In addition to boron-doped diamond forms, two carbides rich in boron, $B_4C$ and $B_{50}C_2$, are known. They are relatively hard but not as hard as diamond.

But all the B—C phases have a higher resistance to oxygen and to ferrous metals than the similar carbon-based materials.

Thus, it has been supposed that the B—C phases of the diamond type would combine the best properties of each element including a very high hardness and a high chemical and thermal stability.

A certain number of B—C phases of graphite structure of various stoichiometries (referred to as boron-substituted graphite with boron contents up to 50 at %) have thus been synthesized by thermochemical vapor deposition.

These novel materials were expected to be perfect precursors for the B—C phases rich in boron of the diamond type.

However, their behaviors at high pressure and at high temperatures have not yet been elucidated until now.

Recent quenching experiments carried out on $BC_3$ of graphite structure showed that at 20 GPa and 2473.16° C. (2200 K), in a multi-anvil press, the phase decomposed to a mixture of boron-doped diamond and boron carbide phases (Solozhenko, V. et al., Synthesis of bulk superhard semiconducting B.C. materials. *Appl. Phys. Lett* 85, 1508-1510 (2004)).

Recently, phase segregations of B—$C_{1.6}$ of the graphite type to a mixture of diamond, boron carbide and elemental boron have been observed in a diamond anvil cell (DAC) at 45 GPa and 2503.16° C. (2230 K) (Shirasaki, T. et al., "Synthesis and characterization of boron-substituted carbons", *Carbon* 38, 1461-1467 (2000)) although the authors indicated having synthesized cubic $BC_{1.6}$.

The invention aims to overcome the drawbacks of the materials of the prior art by providing a boron carbide which is both hard and chemically and thermally stable.

This boron carbide has the chemical formula $BC_5$ and a diamond-type cubic structure with a lattice parameter a=3.635±0.006 Å.

This boron carbide has a Vickers hardness $H_v$ between 63 and 79 GPa, and more particularly of 71 GPa, which is a value close to the hardness of cubic boron carbonitride of formula c-$BC_2N$ which is the hardest phase after that of diamond known to date.

The cubic boron pentacarbide of the invention has a fracture toughness $K_{Ic}$ between 7 and 12 MPa·m$^{1/2}$, more particularly of 9.5 MPa·m$^{1/2}$, which corresponds to the material in its entirety. This value is substantially higher than that of the corresponding values of the known polycrystalline and single-crystal phases of the B—C—N system.

Furthermore, the cubic pentacarbide of the invention has an extremely high nanohardness of between 68 and 88 GPa, more particularly of 78 GPa.

The cubic boron pentacarbide of the invention is stable up to a temperature of 2163.16° C. (1890 K).

The boron pentacarbide of the invention is synthesized from boron pentacarbide of turbostratic structure, t-$BC_5$, at temperatures of around 2473.16° C. (2200 K) and at pressures of around 20 GPa.

The cubic pentacarbide of the invention is also a semiconductor. It has an extreme hardness comparable to that of diamond single crystals and it has an unusually high fracture toughness in combination with a very high thermal stability, which makes it an exceptional superabrasive material. It may, in particular, be used as a machining device.

The invention will be better understood and other advantages and features of the invention will appear more clearly in light of the explanatory description which follows.

The implementation and embodiment examples of the invention which are given below are only given purely by way of illustration and in non-limitingly of the invention.

The cubic boron pentacarbide according to the invention is obtained from a turbostratic boron pentacarbide precursor, t-$BC_5$. The t-$BC_5$ may be obtained by thermo-chemical vapor deposition of a mixture of $C_2H_2$, $BCl_3$ and $H_2$.

The t-$BC_5$ is cold compacted up to between 19 and 22 GPa, preferably to around 20 GPa. At this pressure, the t-$BC_5$ is then heated at a temperature of 2473.16° C. (2200 K).

It is maintained at this pressure and at this temperature for between 5 and 15 min, preferably around 10 minutes, in order to make the cubic $BC_5$ crystals, c-$BC_5$, obtained grow.

Next, the cubic c-$BC_5$ obtained is naturally brought back to ambient temperature by turning off the heating and the pressure is brought back to ambient pressure.

EXAMPLE 1

Synthesis of Cubic Boron Pentacarbide, c-$BC_5$, of the Invention a) Synthesis of the Turbostratic Boron Pentacarbide, t-$BC_5$.

The initial sample of t-$BC_5$ was prepared by a low-pressure chemical vapor deposition (LPCVD) technique.

The reactor was a tube with a diameter of 40 mm made of aluminum oxide $Al_2O_3$. The gas pressure in this reactor (standard reactor, according to the description by DERRE, A. et al., *J. Phys. IV* 3, p. 195 (1993)) was kept constant at 30 Mbar, the temperature of the reactor and of the substrate (made of quartz) was brought to 1100° C. The gases injected into this reactor were then $BCl_3$ (at a flow rate of 7.6 cm³·min⁻¹), acetylene ($C_2H_2$, at a flow rate of 11 cm³·min⁻¹) and hydrogen ($H_2$, at a flow rate of 477 cm³·min⁻¹). At the end of 30 minutes, the flow of $BCl_3$ was stopped, then immediately after that of acetylene and of hydrogen were stopped. The substrate was subsequently brought back (naturally) to ambient temperature and the sample of t-$BC_5$ produced during this procedure was able to be easily recovered and analyzed (by various techniques such as, for example, electron probe microanalysis, by Rutherford back-scattering spectrometry or by standard chemical analyses) in order to check that it has the correct stoichiometry. Via this method, several milligrams of t-$BC_5$ can be produced in a few hours.

b) Synthesis of the Cubic Boron Pentacarbide, c-$BC_5$.

The t-$BC_5$ obtained in step a) is placed in a multi-anvil press and cold compacted up to 20 GPa.

At this pressure, the temperature is raised up to 2473.16° C. (2200 K) and the sample is held at this pressure and at this temperature for 10 min. Then the heating is turned off and the sample of c-$BC_5$ obtained is left to return to ambient temperature naturally.

Once ambient temperature is reached, the pressure is reduced in the chamber until it returns to ambient pressure.

The sample of c-$BC_5$ is then taken out of the press.

EXAMPLE 2

Crystallographic Analysis

X-Ray diffraction analysis was obtained with synchrotron radiation.

At ambient temperature and pressure, the X-ray diffraction spectrum of the turbostratic boron pentacarbide has broad symmetrical lines 001 and 002 and asymmetric two-dimensional reflections 10 and 11 that are typical for turbostratic, that is to say completely one-dimensionally disordered, layered structures.

At ambient pressure and temperature, the lattice parameters of the t-$BC_5$ are: a=2.43 Å and c=3.45 Å and show a complex dependence as a function of the boron content, the size of the crystallites and the structure defects (strains).

At ambient temperature and pressure, the diffraction spectrum of the cubic boron pentacarbide of the invention shows only the lines 111, 220 and 311 of the cubic lattice, which indicates that the sample is a single phase. The X-ray diffraction spectrum of the boron pentacarbide of the invention has very weak reflections 20 and 311, which is quite obviously caused by a strong preferential orientation along the 111 direction of the diamond-type phase.

This is very unusual for isotropic cubic phases and rules out a diffusion mechanism of the growth of the c-$BC_5$.

The lattice parameter a of the cubic pentacarbide of the invention at ambient temperature and pressure is 3.635±0.006 Å, which is larger than the lattice parameter a of diamond (a=3.5667 Å, JCPDS, number 6-0675) and of cubic boron nitride (3.6158 Å, JCPDS, number 35-1365).

This is consistent with the fact that the B—C bond is longer than the C—C and B—N bonds. The value of the parameter a for the cubic boron pentacarbide expected from the ideal mixture (Végard's law) between diamond and the boron "of diamond structure" (a=4.04 Å corresponding to the value of the B—B bond of 1.75 Å) is 3.646 Å, which is in good agreement with the experimental value.

The cubic boron pentacarbide obtained in example 1 was then studied by transmission electron microscopy (TEM) on a Visio M2010 HR (JEOL) machine operating at 200 kV. The microstructure of the sample was characterized by high-resolution and bright-field (BF) transmission electron microscopy and also by selected area electron diffraction (SAED).

In order to obtain the interplanar spacings of the cubic boron pentacarbide, the SAED ring patterns were quantitatively evaluated using the "Process Diffraction" software.

The camera constant was calibrated with the aluminum standard. The three strongest diffraction rings 111, 220 and 311 were then used to estimate the lattice constant a=3.59 Å.

According to the TEM observations, the cubic boron pentacarbide of the invention appears as nanocrystalline aggregates with very small but clearly visible grains. All the grains appear to be round.

EXAMPLE 3

Measurement of the Vickers Hardness

The sample from example 1 was then subjected to a measurement of the Vickers hardness. These measurements were carried out with a Struers Duramin-20 microhardness tester under a load of 1 to 20 N. Hard steel (421HV0.1, MPANRW 725001.1105) and a single crystal of cubic boron nitride, which was grown in the $Li_3N$—BN system, were used as standards.

The hardness value obtained on the cubic boron pentacarbide obtained in example 1 was =71 GPa, which is close to the hardness of the cubic c-$BC_2N$, the second hardest known phase.

At loads of 10 and 20 N tons, cracks are observed, which were around two times longer than the indentations, and of an order of magnitude longer than the grain size.

This made it possible to calculate the reliable value, independent of the load and of the fracture toughness, by the method described in Solozhenko, V. L. et al., "Mechanical properties of cubic $BC_2N$, a new superhard phase", *Diamond Relat. Mater.* 10, 2228-2231 (2001).

Nanoindentation tests were then carried out using the electrostatic transducer of UBI 1 (Hysitron) triboscope.

An extremely high nanohardness of 78 GPa was obtained.

EXAMPLE 4

Measurement of the Electrical Resistivity

The electrical resistivity of the sample obtained in example 1 was measured at ambient temperature by the standard four-point probe technique combined with the method of van der Pauw, as described in van der Pauw, L. J.: "A method of measuring specific resistivity and Hall effect of discs of arbitrary shape", Philips Research Reports 13, pp. 1-9 (1958), and in van der Pauw, L. J.: "A method of measuring the resistivity and Hall coefficient on lamellae of arbitrary shape", Philips Technical Review 20, pp. 220-224 (1958).

The dimensions of the sample, the positioning of the probes and the spacing between the electrodes were carefully measured with a microscope and used to convert the resistance data to resistivity via well-known correction factors, as described in van der Pauw, L. J.: "A method of measuring specific resistivity and Hall effect of discs of arbitrary shape", Philips Research Reports 13, pp. 1-9 (1958), and in van der Pauw, L. J.: "A method of measuring the resistivity and Hall coefficient on lamellae of arbitrary shape", Philips Technical Review 20, pp. 220-224 (1958).

The electrical resistivity at ambient temperature of the cubic boron pentacarbide obtained in example 1 was 0.6 Ωm, which is a value typical of semiconductors.

EXAMPLE 5

Measurement of the Thermal Stability

The sample of cubic boron pentacarbide obtained in example 1 was then studied as regards its thermal stability using a MAX80 multi-anvil device coupled to synchrotron radiation.

The diffraction measurements were carried out by energy dispersion on the HASYLAB-DESY DORIS III positron storage ring (Hamburg, Germany).

To prevent oxidation of the sample, a graphite capsule was used.

The temperature was controlled by a regulator controlled by a computer in the temperature range between 673.16° C. (400 K) and 1473° C. (1200 K) inclusive, with a temperature difference of ±2° C. (2 K) and in the temperature range between 1573.16° C. (1300 K) and 2173.16° C. (1900 K) inclusive, with a temperature difference of ±4° C. (4 K).

The temperature of the sample was measured using a rhodiated platinum/platinum thermocouple, more specifically a 10% RhPt/Pt thermocouple with its junction 300 μm below the region of the sample studied.

The results show that at a temperature of 2163.16° C. (1890 K) there is no change in the powder spectra, which indicates a thermal stability of the cubic boron pentacarbide of the invention at temperatures below 2163.16° C. (1890 K).

At higher temperatures, the cubic boron pentacarbide of the invention decomposes to graphite and amorphous boron.

Thus, the cubic boron pentacarbide of the invention is characterized by a thermal stability that is 400 to 500° C. (400 to 500 K) higher than the polycrystalline diamond having the same grain size.

In conclusion, the cubic boron pentacarbide of the invention is a semiconductor, has an extreme hardness comparable to that of a single crystal of diamond and an unusually high fracture toughness in combination with a very high thermal stability, which makes it an exceptional superabrasive material.

The invention claimed is:

1. A boron carbide having the formula $BC_5$ which has a diamond-type cubic structure with a lattice parameter a=3.635±0.006 Å.

2. The boron carbide as claimed in claim 1, wherein it has:
   Vickers hardness $H_v$ between 63 and 79 GPa;
   a nanohardness between 68 and 88 GPa;
   a thermal stability up to 2163.16° C. (1890 K); and
   a fracture toughness $K_{Ic}$ between 7 and 12 MPa·m$^{1/2}$ inclusive.

3. The boron carbide as claimed in claim 1, wherein it has a Vickers hardness $H_v$ of 71 GPa, a nanohardness of 78 GPa and a fracture toughness $K_{Ic}$ of 9.5 MPa·m$^{1/2}$.

4. A method of manufacturing the boron carbide as claimed in claim 1 comprising:
   a) the thermochemical vapor deposition of a mixture of $C_2H_2$, $BCl_3$ and $H_2$ in order to obtain a turbostratic boron pentacarbide precursor, t-$BC_5$;
   b) the cold compacting of the t-$BC_5$ obtained up to between 19 and 22 GPa;
   c) the heating at 2473.16° C. (2200 K) of the compacted precursor obtained;
   d) maintaining the pressure and the temperature for between around 5 and 15 min inclusive, in order to make the cubic $BC_5$ crystals obtained grow;
   e) cooling to ambient temperature; and
   f) reducing the pressure to ambient pressure.

5. A superabrasive material comprising the boron carbide as claimed in claim 1.

6. A machining device comprising the boron carbide as claimed in claim 1.

* * * * *